United States Patent
Gerdes et al.

(10) Patent No.: US 9,960,428 B1
(45) Date of Patent: May 1, 2018

(54) METHOD OF FORMING CATALYST LAYER BY SINGLE STEP INFILTRATION

(71) Applicant: Energy, United States Department of, Washington, DC (US)

(72) Inventors: Kirk Gerdes, Morgantown, WV (US); Shiwoo Lee, Morgantown, WV (US); Regis Dowd, Lone Jack, MO (US)

(73) Assignee: U.S. Department of Energy, Washington, DC (US)

( * ) Notice: Subject to any disclaimer, the term of this patent is extended or adjusted under 35 U.S.C. 154(b) by 91 days.

(21) Appl. No.: 15/208,912

(22) Filed: Jul. 13, 2016

Related U.S. Application Data

(60) Provisional application No. 62/191,548, filed on Jul. 13, 2015.

(51) Int. Cl.
  *H01M 4/88* (2006.01)
  *H01M 8/12* (2016.01)
  *H01M 4/86* (2006.01)
  *H01M 8/124* (2016.01)

(52) U.S. Cl.
  CPC ....... *H01M 4/8842* (2013.01); *H01M 4/8605* (2013.01); *H01M 8/12* (2013.01); *H01M 2008/1293* (2013.01); *H01M 2250/10* (2013.01); *H01M 2250/20* (2013.01); *H01M 2300/0074* (2013.01)

(58) Field of Classification Search
  CPC ..... H01M 4/8842; H01M 4/8605; H01M 8/12
  See application file for complete search history.

(56) References Cited

U.S. PATENT DOCUMENTS

2004/0038808 A1\* 2/2004 Hampden-Smith ...... B01J 21/18
  502/180

\* cited by examiner

*Primary Examiner* — Brittany Raymond
(74) *Attorney, Agent, or Firm* — Jacob A. Heafner; Michael J. Dobbs; Brian J. Lally

(57) ABSTRACT

Provided herein is a method for electrocatalyst infiltration of a porous substrate, of particular use for preparation of a cathode for a solid oxide fuel cell. The method generally comprises preparing an electrocatalyst infiltrate solution comprising an electrocatalyst, surfactant, chelating agent, and a solvent; pretreating a porous mixed ionic-electric conductive substrate; and applying the electrocatalyst infiltration solution to the porous mixed ionic-electric conductive substrate.

24 Claims, 2 Drawing Sheets

METHOD OF FORMING CATALYST LAYER BY SINGLE STEP INFILTRATION

RELATION TO OTHER APPLICATIONS

The present patent application claims priority to U.S. Provisional Patent No. 62/191,548 filed Jul. 13, 2015, and entitled "Method of forming catalyst layer by single step infiltration" the contents of which are hereby incorporated by reference.

GOVERNMENT INTERESTS

The United States Government has rights in this invention pursuant to the employer-employee relationship of the Government to the inventors as U.S. Department of Energy employees and site-support contractors at the National Energy Technology Laboratory.

FIELD OF THE INVENTION

The present invention relates to electrical energy generation systems, and more particularly, to solid oxide fuel cells. One or more embodiments relate to a method for infiltration of an 8-10 weight percent of an electrocatalyst into a LaSrCoFeO—CeSmO cathode of a solid oxide fuel cell.

BACKGROUND

Solid oxide fuel cells (SOFC) are a class of fuel cells characterized by the use of a solid oxide material as an electrolyte, which conducts negative oxygen ions from a cathode to an anode. At the anode, the negative oxygen ions combine electrochemically with hydrogen and/or carbon monoxide to form water and/or carbon dioxide, respectively. Solid oxide fuel cells have a wide variety of applications from use as auxiliary power units in vehicles to stationary power generation with outputs ranging from 100 W to 2 MW, at an energy efficiency of about 60 percent. Unlike many other types of fuel cells, solid oxide fuel cells can have multiple geometries. A typical planar fuel cell design has a sandwich-type geometry, where a relatively dense electrolyte is sandwiched between a cathode and an anode. This sandwich type geometry facilitates the stacking of hundreds of cells in series, with each cell typically having a thickness on the order of a few millimeters. Because the ceramics used in conventional fuel cells do not become electrically and ionically active until they reach high temperatures, stacks of cells must typically run at temperatures ranging from about 500° C. to about 1000° C.

Operation of a fuel cell begins by a reduction of oxygen into oxygen ions at the cathode. These ions can then diffuse through the solid oxide electrolyte to the anode, where they can electrochemically combine with a fuel, such as a light hydrocarbon fuel (e.g., methane, propane and butane) to form water and carbon dioxide, releasing electrons at the anode, which flow through an external circuit, performing electrical work, back to the cathode.

The anode typically must be highly porous to enable fuel to flow towards the electrolyte. Like the cathode, the anode must conduct electrons with low resistivity and should have high ionic conductivity. A common anode material is a cermet made up of nickel mixed with the same ceramic material used for the electrolyte of the cell, which is typically yttria-stabilized zirconia (YSZ). The anode may be the thickest and strongest layer in each individual cell, because it has the smallest polarization losses and is often the layer used to provide mechanical support to the cell. The function of the anode is to oxidize the fuel efficiently. The electrochemical oxidation of hydrogen within the cell produces heat as well as water and electricity. If the fuel is a light hydrocarbon, such as methane, then another function of the anode is to act as a catalyst for steam reformation of the fuel into hydrogen and carbon monoxide. This additional function provides a benefit to a fuel cell stack because the reforming reaction is endothermic and provides internal cooling to the stack of individual cells.

The electrolyte of a fuel cell is typically a dense layer that conducts oxygen ions with preferably high ionic conductivity. However, to prevent leakage currents flowing between the anode and cathode, the electronic conductivity of the electrolyte should be as low as possible. The relatively high operating temperature of solid oxide fuel cells supports high oxygen ion transport through the electrolyte. Popular electrolyte materials include YSZ, scandia-stabilized zirconia (ScSZ) and gadolinium-doped ceria (GDC). Detrimental reactions between YSZ electrolytes and cathode materials, such as lanthanum strontium cobalt ferrite (LSCF), can be prevented using a thin (e.g., < a few microns) diffusion barrier/buffer layer, such as ceria.

The cathode of a fuel cell is typically a thin porous layer on the electrolyte where oxygen reduction takes place. Cathode materials must be, at a minimum, electronically conductive. Currently, lanthanum strontium manganite (LSM) is the cathode material of choice for many commercial applications because of its compatibility with doped zirconia electrolytes. This compatibility includes a similar coefficient of thermal expansion (CTE) and a low chemical reactivity with YSZ. Unfortunately, LSM is a relatively poor ionic conductor, which means that an electrochemically active reaction for oxygen reduction is limited to a triple-phase boundary (TPB) where the electrolyte, air and cathode meet.

In order to increase the reaction zone for oxygen reduction beyond the TPB, a cathode material containing a composite of LSM and YSZ has been used because it has a relatively high electron and oxygen ion conductivity. One state-of-the-art cathode is a porous composite of $(La_{0.8}Sr_{0.2})_{0.95}MnO_{3+\delta}$ (LSM) and the solid electrolyte 8% $Y_2O_3$-doped $ZrO_2$ (YSZ), with the volumetric composition of the composite being approximately 40% pore, 35% LSM and 25% YSZ. This composite has been shown to be advantageous relative to porous LSM, because YSZ is a better ionic conductor than LSM. The active area of porous LSM is limited to regions close to the dense YSZ electrolyte, but in the LSM/YSZ composite, the active area is extended beyond the triple-phase boundary by the availability of YSZ in the porous cathode, which acts as a fast ionic transport pathway.

Unfortunately, the performance of the composite LSM/YSZ cathode may be limited by the fact that there may be only about 30% connectivity for the YSZ within the composite, which means that inactive YSZ clusters will exist at points relatively far from the electrolyte. This connectivity problem may be overcome by creating a cathode having a non-random composite microstructure using, for example, an infiltration technique. One such infiltration technique includes firing a porous, single phase YSZ backbone, and then infiltrating liquid precursors of LSM into the porous YSZ backbone before re-firing. This technique has been shown to yield a thin dense coating (about 60 nm) of LSM over the YSZ. Unfortunately, even this very thin coating of LSM is typically much less electrochemically active than a morphology with an exposed triple-phase boundary. Moreover, the LSM coating may suffer relatively high sheet resistance at moderate cell current densities.

As an alternative to infiltrating a YSZ backbone with LSM precursors, mixed ionic electronic conducting (MIEC) materials such as porous $La_xSr_{1-x}Co_yFe_{1-y}O_{3-\delta}$ (LSCF) have been used as a cathode in solid oxide fuel cell applications because it has much higher ionic and electrical conductivity relative to LSM at intermediate temperatures. LSCF may be further mixed with an ionically conducting phase samarium doped ceria (SDC) to form an LSCF-SDC composite cathode.

However, infiltrating an electrocatalyst into an exemplary LSCF-SDC cathode base has been prohibitively complex. A typical wet impregnation infiltration process for the cathode requires multiple iterations using a low electrocatalyst concentration in order to prevent agglomeration at the cathode's surface while also depositing a sufficient amount of electrocatalyst at the cathode active layer to positively impact performance and degradation. One alternative approach established a one-step infiltration method by submerging a tubular fuel cell into an electrocatalyst and then heating the solution. Another alternative infiltrated planar SOFCs by using a vacuum dip-coating method. However, in these approaches the electrocatalyst cannot be tailored for the anode and cathode independently. Moreover, these processes require additional energy input in the form of heat and vacuum, which makes it more challenging for integration into an existing manufacturing process.

Thus, it is advantageous to provide the present method of wet impregnation infiltration of an electrocatalyst into a porous substrate in a single step to provide an optimized cathode for a SOFC while also greatly reducing the overall production time and cost.

These and other objects, aspects, and advantages of the present disclosure will become better understood with reference to the accompanying description and claims.

SUMMARY

The disclosure provides a method for preparation of a cathode for a solid oxide fuel cell (SOFC). The method generally comprises preparing an electrocatalyst infiltrate solution comprising metal salts, surfactant, chelating agent, and a solvent; pretreating a porous mixed ionic-electric conductive substrate; and applying the electrocatalyst solution to the porous mixed ionic-electric conductive substrate.

The novel process and principles of operation are further discussed in the following description.

DETAILED DESCRIPTION

Figure 1:
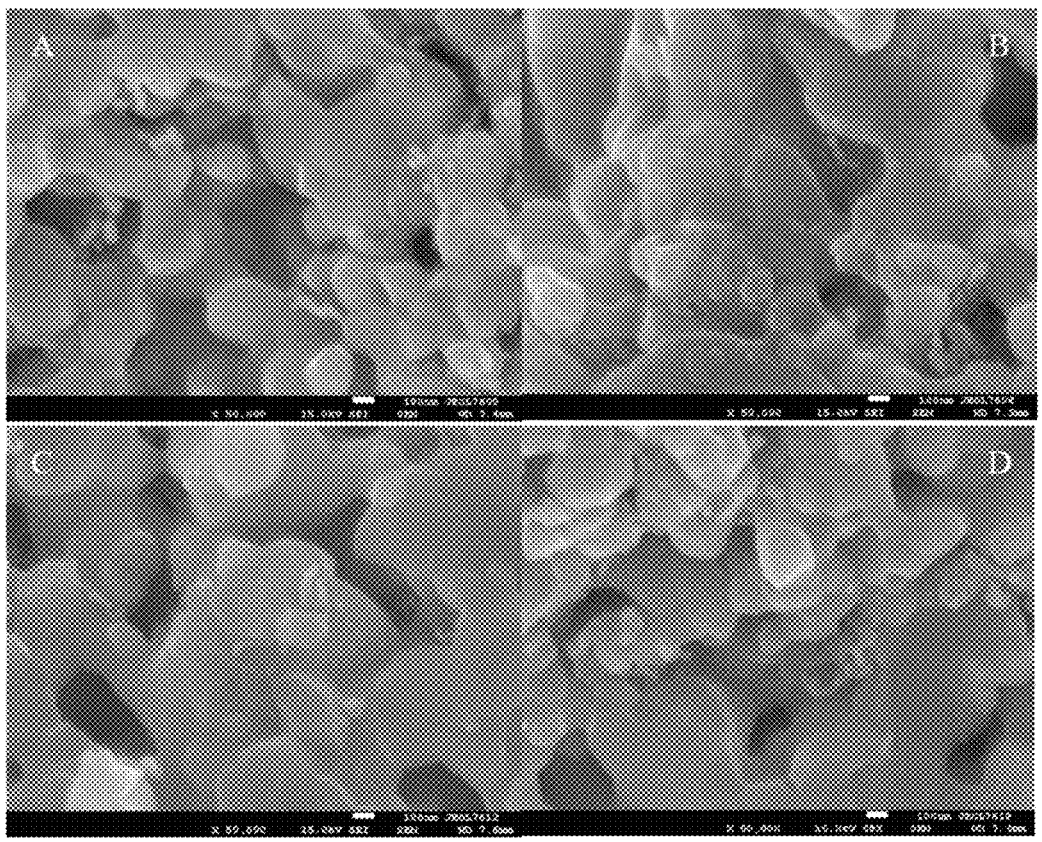
FIG. 1 shows an SEM Image of Cathode Active Catalyst Layer using 1M LSCo with 1:1 Citric Acid and (A) 50% CMC SDS, (B) 100% CMC SDS, (C) 50% CMC Triton X-100, and (D) 100% CMC Triton X-100.

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a method for infiltrating a porous mixed ionic-electric conductive (MIEC) substrate with a catalytic infiltrate to provide a cathode for a SOFC.

Preparing an Electrocatalyst Infiltrate Solution:

Solvent: The electrocatalyst infiltrate solution necessarily comprises an electrocatalyst, surfactant, chelating agent, and a solvent. With the method, the electrocatalyst infiltration solution is generally aqueous solution or mixture of water and non-aqueous solvent with low surface tension.

Electrocatalyst:

Electrocatalysts suitable for use in the method can be categorized by crystallographic structure, which is related with electronic defect chemistry affecting charge transfer processes, ionic diffusion, or molecular incorporation processes at surfaces. They may be a multi-component oxide selected from perovskite structure (e.g., LSCo, PSCo, BSCF, etc.) or perovskite-related structure including $K_2NiF_4$ (e.g., LSCo214, PSCo214, etc.). Precious metal doped perovskite or perovskite-related structures with high catalytic activity and good structural stability may also be used. Such materials also include to spinel structures (e.g. $SrFe_2O_4$, $MnFe_2O_4$), pyrochlore structures (e.g. $La_2Zr_{2-x}Rh_xO_7$) and precious metals. The electrocatalysts are not necessarily an electrolyte, but may be precursors of metals that will form a solid electrocatalyst after heating (calcination).

Preferable electrocatalysts include: LSCo ($La_{0.6}Sr_{0.4}CoO_{3-\delta}$), PSCo ($Pr_{0.6}Sr_{0.4}CoO_3$), and BSCF ($Ba_{0.5}Sr_{0.5}CO_{0.8}Fe_{0.2}O_{3-\delta}$). The most preferred electrocatalyst is an LSCo.

The preferred concentration of electrocatalyst in the form of metal salt is from about 0.2 M to about 1.0 M. The relatively high concentration is allowable due to the complexation and balancing of further solution components. However, a too low concentration fails to achieve the desired electrocatalyst wt % threshold, while the higher concentration approaches saturation and premature precipitation of solution constituents. More preferably, the electrocatalyst is in a concentration from about 0.5 M to about 1.0 M. Most preferably, the electrocatalyst is in a concentration from about 0.8 M to about 1.0 M.

Chelating Agents:

The electrocatalyst infiltration solution further comprises a chelating agent. Chelating agents (ligands capable of forming polydentate bonds to an atom) are added to the electrocatalyst infiltration solution to assist with forming the correct catalyst phase upon calcination. The concentration of the chelating agents serves to control the concentration and viscosity of infiltration solution entering the pores of the substrate, ultimately effecting the residual infiltrate mass to achieve a targeted threshold amount of electrocatalyst in a cathode after only a one step infiltration. Further, the chelating agents promote dispersion of the electrocatalyst throughout the porous substrate.

Preferable chelating agents selected for the method are determined by consideration of solubility in solvent, viscosity of solution, and effectiveness to form desired electrocatalyst phases at lower calcination temperature. Preferred chelating agents include ethylenediaminetetraacetic acid (EDTA), urea, and citric acid. The most preferred chelating agent is citric acid.

Chelating concentration within the electrocatalyst infiltration solution is expressed as a function of molar ratio relative to the metal cation concentration, expressed as moles of metal cations: moles of chelating agents. In one embodiment, the molar ratio is from about 1:1 metal cation to chelating agent to about 1:0.1. Preferably, the molar ratio is from about 1:0.5 to about 1:0.2. Most preferably, the molar ratio is from about 1:0.4 to about 1:0.25.

Surfactants:

Critical to the performance of the method is that the electrocatalyst infiltration solution further comprises a surfactant. Surfactants in the solution serve to improve the wettability of the solution. A wetting liquid forms a contact angle with the solid that is less than 90°, whereas a non-wetting liquid creates a contact angle between 90° and 180° with a substrate. Suitable surfactants include nonionic, anionic, cationic, and polymeric solvents. Nonionic surfactants are most preferred.

With respect to surfactants, the concentration of the surfactant is characterized as critical micelle concentration (CMC), which is the surfactant concentration above which additional surfactant goes into making micelles instead of individual surfactant molecules dispersed in solution. A specific concentration is reflected as % CMC. A solution's surface tension lowers sharply when approaching CMC, but changes much less above the CMC. Within the electrocatalyst infiltration solution, a surfactant concentration above 100% CMC is driven towards generation of micelles instead of solvating the solute.

Within the disclosed method, surfactants are present in the electrocatalyst infiltration solution in a concentration greater than 30% CMC. In another embodiment, surfactants are in a concentration greater than 50% CMC. More preferably, the surfactants are in a concentration greater than about 80%. In yet another embodiment, the surfactants are in a concentration greater than about 95 percent. Most preferably, the surfactants are in a concentration of about 100% CMC. As shown in the SEM image of FIG. 1, infiltration of the electrocatalyst in a cathode active catalyst layer increased along with an increase of % CMC, using 1M LSCo with 1:1 Citric Acid and (A) 50% CMC SDS, (B) 100% CMC SDS, (C) 50% CMC Triton X-100, and (D) 100% CMC Triton X-100.

The electrocatalyst infiltration solution is formed by using various methods found practical in the art. In one example, the solution is prepared through sonication at room temperature. In another example, the solution may be mixed by stirring at an elevated temperature during the addition of the components.

Pretreating a Porous Substrate:

The method disclosed may be implemented to any cathode with porous structure that provides a diffusion path of oxidant gases during fuel cell operation. The porous substrates as used in the method are mixed ionic-electronic conductive (MIEC) substrates as used in solid oxide fuel cells. Pore diameter of substrates shouldn't be too small (a few hundred nanometer) not to impede solution penetration which mostly relies on capillary forces. Preferably, pore size is in a range from about 0.5 micrometer to about 2 micrometer. Porosity should be in the range of 25-67%, preferentially 30-45%. The state-of-the-art cathode has a median pore size less than 1 micrometer, 30-50 micrometer thickness, which is sometimes covered by an additional current collecting layer.

In pretreating, the porous substrates are prepared for application of the electrocatalyst infiltration solution. The porous substrates are prepared by manipulating their temperature prior to the application step. Additionally, the temperature of the porous surface may be manipulated during the application step. Elevated temperatures, while initially may be thought to increase migration of the electrocatalyst infiltration solution through the porous substrate, promote drying of the solution nearer the application surface before the solution can achieve optimal dispersion of the electrocatalyst.

Applying the Electrocatalyst Infiltration Solution:

In applying the electrocatalyst infiltration solution, the solution is deposited onto the surface of the porous substrate. Preferentially, applying is performed by ultrasonic spray application (without heating of the solution to promote solvent evaporation). Ultrasonic spray application atomizes the solution while spraying the solution onto the surface. In an ultrasonic nozzle used to perform ultrasonic spray application, standing waives are formed from mechanical vibrations. At the atomizing surface, droplets fall from the nozzle tip to create a relatively soft spray. Drop size is dependent on the dependent on the operating frequency: The median diameter of drops at 120 kHz is approximately 17 microns. Higher frequencies produce a smaller median drop size. Both drop size and total solution mass per unit area are critical parameters, and control is necessary for single-step infiltration. Frequency and translational velocity of an ultrasonic nozzle are critical parameters. In one embodiment of the disclosed method, particular droplet size is in a range from about 10 micron to about 20 microns, which are typically obtainable with ultrasonic nozzles of 100-200 kHz.

Figure 2:
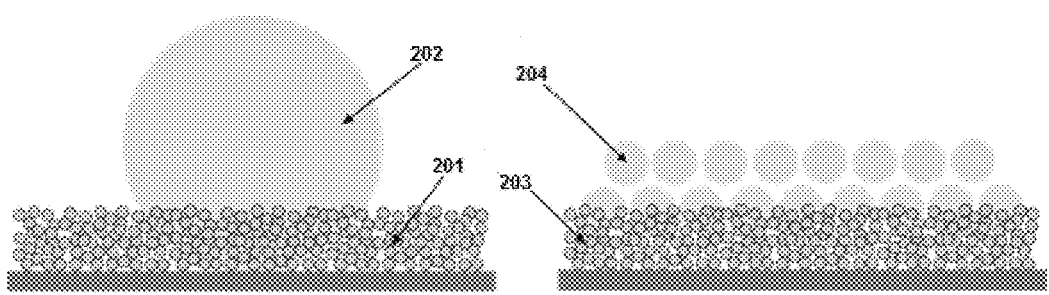
FIG. 2 illustrates conventional manual electrocatalyst infiltration versus infiltration via ultrasonic atomization.

The atomization process is relatively unpressurized. The infiltration solution is delivered through the nozzle to an atomizing surface where the device's ultrasonic vibrational energy is concentrated. The principal features of this technique are: finer drops than can be produced by pressure atomization methods; very low drop velocity; very low flow rate capabilities; narrow spray patterns; and elimination of nozzle clogging. Compressed air, typically at 1 psig, may be introduced into the diffusion chamber of the air shroud, which produces a uniformly distributed flow of air around the nozzle stem. Ultrasonic atomizing nozzles with low pressure air produce a soft highly focused beam of small spray drops. Referring now to FIG. 2, a conventional manual infiltration of the porous substrate 201 results in large droplets 202 which fail to achieve an acceptable distribution of electrocatalyst, while on the porous substrate 203 the small spray drops 204 via ultrasonic atomization achieve a more even distribution.

Formed SOFC Cathode

The method comprising generally preparing an electrocatalyst infiltration solution, pretreating a porous substrate, and applying the electrocatalyst infiltration solution to the porous substrate forms a SOFC cathode. The SOFC cathode has a well dispersed electrocatalyst in a threshold wt % suitable for industrial application, and is achievable using only a one-step application of the electrocatalyst infiltration solution. Thus, in a preferred implementation, the SOFC cathode is an intrinsically functional electrode (e.g. YSZ/LSM or SDC(GDC)/LSCF) that is infiltrated with a solution of a precursor for an electrocatalytic material with a single infiltration.

In one embodiment, the SOFC cathode resulting from the method provides a threshold amount of infiltrated electrocatalyst of 2-10 wt %. Preferably, the SOFC cathode has a threshold amount from about 4 wt % to about 10 wt %. More preferably, the SOFC cathode has a threshold amount from about 6 wt % to about 10 wt %.

In one embodiment, the method is directed to the cathode of a tubular cell. In another embodiment, the method is directed to the cathode of a planar cell. In yet another embodiment, the method further comprises incorporating non-permeable masks which provide for application to complex shaped industrial cell cathodes.

The disclosed method may also be applied to porous anodes of solid oxide fuel cells. Furthermore, other electrochemical devices such as batteries and gas-separation membranes have porous electrode (surface) structures and may be subjects of the disclosed method.

Examples

LSCo electrocatalyst solutions were prepared at different molar ratios ranging from 0.5M to 1.0M using aqueous solutions of La(NO$_3$)$_3$*6H$_2$O (Alfa Aesar, 99.9%), Sr(NO$_3$)$_2$ (Alfa Aesar, 99.0%), Co(NO$_3$)$_2$*6H$_2$O (GFS Chemicals), and citric acid (Alfa Aesar, 99.5%). LSCo was observed to precipitate at 1.2M when held at room temperature. Citric acid was added as a chelating agent to complex with the metal ions and to assist with forming the correct LSCo phase upon calcination. The citric acid concentration was based on the concentration of metal ions in solution. When the moles of citric acid equalled the moles of metal ions, the mixture was designated 1:1 for identification purposes. Other citric acid concentrations were tested, including 1:0.33 (moles of metal ions: moles of citric acid) and 1:0.67. LSCo solutions were also prepared using the following surfactants: Triton™ X-100 (Sigma-Aldrich), sodium dodecylbenzenesulfonate (SDBS) (Sigma-Aldrich), and sodium dodecyl sulfate (SDS) (Sigma-Aldrich). The LSCo surfactant solutions were sonicated for 1 hr to ensure adequate mixing and uniformity. The surfactants were added according to their CMCs. The CMCs for each surfactant are as follows: 0.23 mM for Triton™ X-100, 1.6 mM for SDBS, and 8.0 mM for SDS.

The electrocatalyst infiltrate solutions were applied to commercially available planar SOFCs made by MSRI (Materials and Systems Research Inc., Salt Lake City, Utah). The anode-supported cells have an active area of 2.0 cm$^2$. They are comprised of a 750 μm thick Ni-YSZ anode, 10 μm thick YSZ electrolyte, and 50 μm thick LSCF-based cathode. The anode also includes an anode functional layer. The cathode includes a 40 μm thick LSCF current collecting layer, a 10 μm thick SDC-LSCF functional layer and a few μm thick dense SDC blocking layer adjacent to the electrolyte. The functional layer positioned between the SDC blocking layer and LSCF current collecting layer.

A Sono-Tek ultrasonic spray nozzle was used to atomize the infiltrate solution while spraying the infiltrate onto the cathode's surface. The infiltrated cells were then placed in a non-convection oven to calcine the electrocatalyst inside the porous cathode structure. At low molarities, multiple spray/calcination steps were required to ensure adequate loading. The infiltrate solution was applied to the surface of the cathode in order to achieve a loading of 6-10 weight percent based on the as-received cathode weight. Therefore, the volume of infiltrate applied to each cell was dependent on the infiltrate molarity used.

A series of fuel cells were developed and tested using a multi-cell testing system. The system simultaneously tested twelve cells in parallel using the same fuel and air composition, flow rate, and cell temperature. During system start-up, the cells were initially heated to 750° C. while flowing air to the cathode and pure nitrogen to the anode. After system temperature stabilized, the anode inlet stream was adjusted to 10% hydrogen-90% nitrogen mixture. Over the next 7 hours, the anode inlet composition was increased stepwise to pure hydrogen. After flowing pure hydrogen to the anode for 24 hours, the cells were loaded to 0.25 A/cm$^2$ using a DC electronic load (Amrel ZVL 60-10-20). Electrochemical Impedance Spectroscopy (EIS) was used to determine cathode polarization resistances at periodic times during the multi-cell testing.

A summary of the testing parameters and results is provided in Table 1:

TABLE 1

| Cell # | Infiltrate | Surfactant (CMC) | Citric Acid Concentration (moles of metal ions:moles of citric acid) | Substrate Temperature (° C.) | Infiltrate Wt (mg) |
|---|---|---|---|---|---|
| 1 | 1M LSCo | None | 1:1 | 20 | 3.1 |
| 2 | 1M LSCo | None | 1:1 | 30 | 3.2 |
| 3 | 1M LSCo | None | 1:1 | 40 | 2.8 |
| 4 | 1M LSCo | 100% CMC SDS | 1:1 | 20 | 3.2 |
| 5 | 1M LSCo | 100% CMC SDS | 1:1 | 20 | 3.1 |
| 6 | 1M LSCo | 100% CMC Triton X-100 | 1:1 | 20 | 3.0 |
| 7 | 1M LSCo | 100% CMC Triton X-100 | 1:1 | 20 | 3.1 |
| 8 | 1M LSCo | 100% CMC SDBS | 1:1 | 20 | 3.0 |
| 9 | 1M LSCo | 100% CMC SDBS | 1:1 | 20 | 2.8 |
| 10 | 1M LSCo | None | 1:0.33 | 20 | 4.2 |
| 11 | 1M LSCo | None | 1:0.50 | 20 | 3.9 |
| 12 | 1M LSCo | None | 1:0.67 | 20 | 3.6 |
| 13 | 1M LSCo | None | 1:0.33 | 20 | 4.0 |
| 14 | 1M LSCo | None | 1:0.33 | 20 | 4.0 |
| 15 | 1M LSCo | None | 1:0.33 | 20 | 4.0 |
| 16 | 1M LSCo | 100% CMC SDS | 1:0.33 | 20 | 4.0 |
| 17 | 1M LSCo | 100% CMC SDS | 1:0.33 | 20 | 4.0 |
| 18 | 1M LSCo | 100% CMC SDS | 1:0.33 | 20 | 3.8 |
| 19 | 1M LSCo | 100% CMC Triton X-100 | 1:0.33 | 20 | 4.0 |
| 20 | 1M LSCo | 100% CMC Triton X-100 | 1:0.33 | 20 | 4.1 |
| 21 | 1M LSCo | 100% CMC Triton X-100 | 1:0.33 | 20 | 4.0 |
| 22 | 1M LSCo | 100% CMC SDBS | 1:0.33 | 20 | 3.8 |
| 23 | 1M LSCo | 100% CMC SDBS | 1:0.33 | 20 | 3.9 |
| 24 | 1M LSCo | 100% CMC SDBS | 1:0.33 | 20 | 3.8 |

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

We claim:
1. A method of electrocatalyst infiltration of a porous substrate comprising
preparing an electrocatalyst infiltration solution, where the electrocatalyst infiltration solution comprises:
a solvent,
an electrocatalyst, where the electrocatalyst is present in the concentration from about 0.2 M to about 1.0 M,
a chelating agent, where the chelating agent is present in a concentration from about 1:0.2 to about 1:1 mol fraction electrocatalyst to chelating agent, and
a surfactant, where the surfactant is present in a concentration from about 30% CMC to about 100% CMC;

pretreating a porous substrate, where the temperature of the porous substrate is from about 10° C. to about 40° C.; and, applying the electrocatalyst infiltration solution to a porous substrate, where the porous substrate is mixed ionic-electronic conductive substrate, thereby forming a cathode.

2. The method of claim 1 where the cathode is a solid oxide fuel cell cathode.

3. The method of claim 1 where the cathode has an electrocatalyst threshold of from about 2 wt % to about 10 wt %.

4. The method of claim 1 where solid oxide fuel cell cathode has an electrocatalyst threshold of from about 6 wt % to about 10 wt %.

5. The method of claim 1, where the porous substrate comprises an LSCF.

6. The method of claim 1, where the porous substrate is an LSCF-SDC.

7. The method of claim 1, where the temperature of the porous substrate is from about 15° C. to about 35° C.

8. The method of claim 1, where the temperature of the porous substrate is from about 15° C. to about 30° C.

9. The method of claim 1, where the electrocatalyst is a metal oxide or noble metal.

10. The method of claim 1, where the electrocatalyst is a metal salt.

11. The method of claim 1, where the electrocatalyst is LSCo.

12. The method of claim 1, where the electrocatalyst is in a concentration from about 0.2 M to about 1.0M.

13. The method of claim 1, where the electrocatalyst is present in a concentration from about 0.5 M to about 1.0M.

14. The method of claim 1, where the electrocatalyst is present in a concentration from about 0.8 M to about 1.0M.

15. The method of claim 1, where the surfactant is a nonionic surfactant.

16. The method of claim 1, where the surfactant is Triton X-100.

17. The method of claim 1, where the surfactant is present in a concentration from about 50% CMC to about 100% CMC.

18. The method of claim 1, where the surfactant is present in a concentration from about 80% CMC to about 100% CMC.

19. The method of claim 1, where the chelating agent is citric acid.

20. The method of claim 1, where the chelating agent is present in a concentration from about 1:0.2 to about 1:0.5 mol fraction electrocatalyst to chelating agent.

21. The method of claim 1, where the chelating agent is present in a concentration from about 1:0.25 to about 1:0.35 mol fraction electrocatalyst to chelating agent.

22. The method of claim 1, where the electrocatalyst infiltration solution is applied by ultrasonic atomization.

23. The method of claim 1, where the applying is by ultrasonic atomization and where the droplet size is in a range from about 10 microns to about 30 microns.

24. A method of electrocatalyst infiltration of a porous substrate comprising:

preparing an electrocatalyst infiltration solution, where the electrocatalyst infiltration solution comprises:
a solvent,
an electrocatalyst, where the electrocatalyst is a metal salt in the concentration from about 0.8 M to about 1.0 M,
a chelating agent, where the chelating agent is present in a concentration from about 1:0.25 to about 1:0.35 mol fraction electrocatalyst to chelating agent, and
a surfactant, where the surfactant is present in a concentration from about 80% CMC to about 100% CMC;

pretreating a porous substrate, where the temperature of the porous substrate is from about 15° C. to about 30° C.; and, applying the electrocatalyst infiltration solution by ultrasonic atomization where the droplet size is in a range from about 10 microns to 30 microns, to a porous substrate, where the porous substrate is mixed ionic-electronic conductive substrate, thereby forming a solid oxide fuel cell cathode.

* * * * *